United States Patent [19]

Cartossi

[11] Patent Number: 5,154,311

[45] Date of Patent: Oct. 13, 1992

[54] COOKING PANS OF CAPSULAR BASE TYPE WITH A PROFILED LATERAL BAND

[75] Inventor: Ferdinando Cartossi, Baveno, Italy

[73] Assignee: Cartossi S.R.L., Italy

[21] Appl. No.: 771,428

[22] Filed: Oct. 4, 1991

[30] Foreign Application Priority Data

Oct. 19, 1990 [IT] Italy .................................. 21970[U]

[51] Int. Cl.⁵ ............................................. A47J 36/02
[52] U.S. Cl. ..................................... 220/626; 220/912; 126/390
[58] Field of Search .................. 220/603, 626, 912; 126/390

[56] References Cited

U.S. PATENT DOCUMENTS

| | | | |
|---|---|---|---|
| 3,045,664 | 7/1962 | Levin | 220/912 |
| 4,204,607 | 5/1980 | Zani | 220/626 |
| 4,350,259 | 9/1982 | Cartossi | 220/626 |
| 4,845,893 | 7/1989 | Racine | 220/912 |
| 4,917,076 | 4/1990 | Nadolph et al. | 220/626 |
| 5,064,055 | 11/1991 | Bessenbach et al. | 220/912 |

Primary Examiner—Joseph Man-Fu Moy
Attorney, Agent, or Firm—Steinberg & Raskin

[57] ABSTRACT

In a cooking pan with a capsular base the lateral wall of the protection covering of the capsular base is shaped with raised portions and/or depressions obtained by providing corresponding recesses and/or projections in the relative region of the die of the mould used to produce the capsular base.

6 Claims, 1 Drawing Sheet

COOKING PANS OF CAPSULAR BASE TYPE WITH A PROFILED LATERAL BAND

DESCRIPTION

This invention relates to cooking pans constructed of a metal of low thermal conductivity, such as stainless steel.

These pans are known to be normally provided with a heat-radiant base consisting having a metal layer of good thermal conductivity such as aluminium, applied to the outer face of the stainless steel pan. This heat-radiant base ensures uniform distribution of the heat supplied by any heating means (such as a flame or an electrical heating element). It is also known to protect the metal layer of high thermal conductivity with an outer protection layer of a metal having a greater resistance to oxidation, scratching and corrosion. This outer protection layer is normally of stainless steel. Regarding, the heat radiant base, it is further known to cover not only the normally circular outer face of the metal layer of high thermal conductivity with said protection layer, but also its lateral annular surface or edge, which extends more or less perpendicular to the pan base. The result is a cooking pan with a heat-radiant base in which the metal layer of high thermal conductivity is completely enclosed or "encapsulated" within the metal of low thermal conductivity of greater resistance to the aforesaid action. A pan of this type is commonly known as a capsular base pan.

Various methods have been developed for constructing cooking pans with a capsular base. Of these, a method widely used for joining together the pan base, the metal layer of high thermal conductivity and its outer protection layer is brazing. However, as known to one having ordinary skill in the art, this method does not ensure intimate structural adhesion between said constituent layers of the heat-radiant base, with serious resultant problems. A method ensuring structural interpenetration between all the constituent layers of the heat-radiant base, and providing a truly monolithic heat-radiant base, has been developed by the present applicant and is the subject of Italian patent 1,209,648, filed in the principal countries of the world.

The object of the present invention is to overcome a particular problem which can arise during the use of pans produced in accordance with this latter method.

In this respect, such pans, because of the way in which they are used, are continuously subjected to successive heating and cooling. By the effect of the heat, the constituent metal layers of the heat-radiant base, and particularly the metal of high thermal conductivity, expand such that the horizontal surface of the base assumes tendentially convex deformation during heating which results in instability in supporting said base on the heat source. The concavity which forms at the centre of the outer horizontal surface of the finished capsular base by using the method described in IT-B-1,209,648, has been found useful in obviating this problem.

The tendentially convex deformation of the metal layers of the base when heated is thus compensated by the pre-existing concavity, so that the base assumes the required planarity when heated.

However, the expansion of the metal layers, which under ideal conditions would occur in the central region of the base, cannot take place uniformly (particularly when the heat source is not homogeneous or if the pan is not correctly centered on the heat source), giving rise to localized peripheral deformations, for example in part of the perimetral band or lateral face of the capsular base, where these deformations are not compensated by pre-existing concavity, this being centered on the base. In this situation, the planarity of the heat-radiant base of the pan is compromised during the heating necessary for cooking, and the adhesion of said base to the heat source is no longer perfect. This must be avoided if highest quality pans are to be produced, and particularly those pans to be used on the very recent glass ceramic cooking hobs, in which the mutual adhesion between the base of the cooking pan and the hob must be perfect, and even more so in the case of pans to be used on the most recent induction cooking hobs, in which any lack of adhesion compromises the heating as it interrupts regular flow of induced currents. The object of the present invention is therefore to prevent the formation of the aforesaid deformation in the perimetral regions of the base or in those regions in which deformation cannot be compensated by the pre-existing concavity.

Said object is attained by the capsular based cooking pan of the present invention, characterized in that the lateral wall of the protection covering of the capsular base is shaped with raised portions on its outer surface corresponding with depressions on its inner surface obtained by providing corresponding recesses and/or projections in the relative region of the die of the mould used to produce the capsular base of the cooking pan in the method of the cited patent IT-B-1,209,648.

A raised portion on the outer surface of the lateral wall of the protection covering corresponds to a depression in the inner surface of said lateral wall, and vice versa.

The invention therefore provides a pan which on the lateral wall of its capsular base comprises raised portions and/or depressions acting as ribs and involving both the lateral wall of the outer covering of the capsular base and the lateral wall of the inner layer of high thermal conductivity in contact with the inner surface of said lateral wall of the outer covering. As the metal of high thermal conductivity forms a monolithic structure with the protection covering by virtue of the use of the method of IT-B-1,209,648, the entire peripheral band of the capsular base is considerably stiffened by said ribs.

As any deformation of the perimetral region of the heat-radiant base is therefore prevented, the expansion consequent on heating is obliged to act in the region of least resistance, particularly in the central region of the base, even through contact with the heat source occurs mainly at points not corresponding with said central region of the heat-radiant base.

In addition to preventing any deformation in the peripheral regions of the capsular base, the cooking pan according to the present invention also has the significant advantage that said raised portions and/or depressions provided in the lateral wall of the protection covering, being visible, can also perform an interesting aesthetic and decorative function. The shape of these raised portions and/or depressions can in effect be the most varied compatible with their feasibility and the annular space available.

Feasibility in this sense means the possibility of producing said raised portions and/or depressions by the method of the aforesaid patent, the required raised portions or protuberances being the result of machining the surface of the die of the mould used in said method.

The present invention will be more apparent from the following description of a pan according to the invention, given by way of example with reference to the accompanying drawings, in which.

Figure 1:
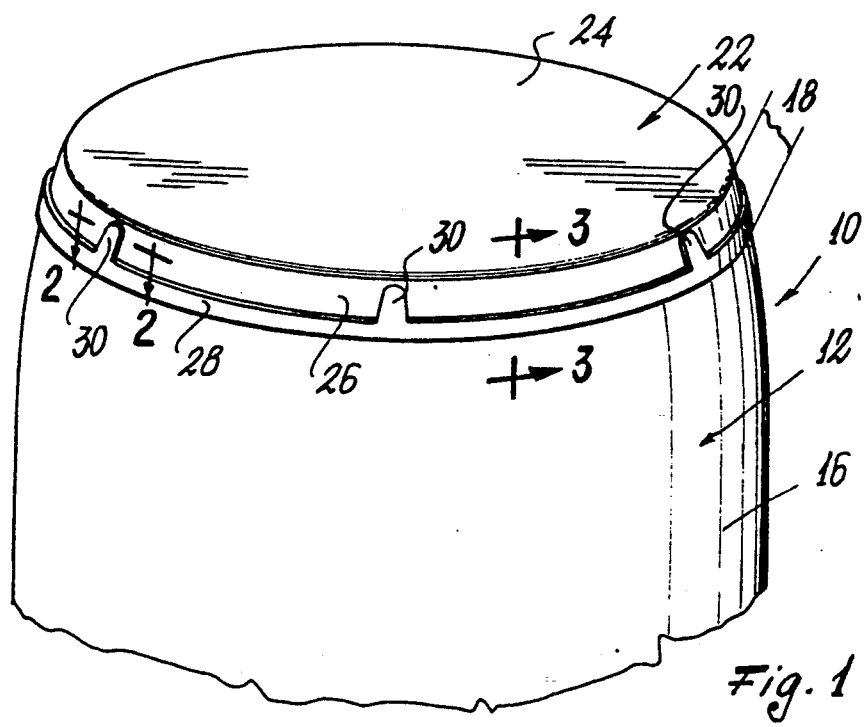
FIG. 1 is a partial perspective view of a cooking pan with a heat-radiant base according to the present invention, the pan being shown only in part and inverted, for reasons of clarity.
Figure 2:
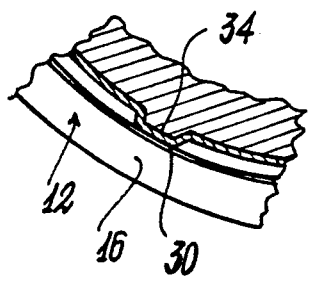
FIG. 2 is a horizontal cross-section on the line 2—2 of FIG. 1.

From the figures it can be seen that in the cooking pan 10, of which FIG. 1 shows only the heat-radiant base and that wall part in proximity to said base, the actual stainless steel pan 12 is formed of a base wall 14 and a lateral wall 16 in one piece. The base wall 14 forms part of the heat-radiant base 18 which also comprises an intermediate layer 20 in contact with the base wall 14 and consisting of a metal of high thermal conductivity (such as aluminium), plus an outer or protection covering 22 which covers the entire surface of the intermediate layer 20 not in contact with the base wall 14.

As can be seen from the figures, the protection covering 22 comprises a more or less flat base wall 24 and a lateral wall 26 of annular shape.

The base wall 14, the intermediate layer 20 and the outer covering 22 together form that which is commonly known by the one having ordinary skill art as a "capsular" base.

As stated, the capsular heat-radiant base 18 is substantially produced by the method described in the aforesaid Italian patent No. 1,209,648, which enables a truly monolithic capsular base to be obtained and prevents gas bubbles remaining trapped within the capsular base.

Figure 3:
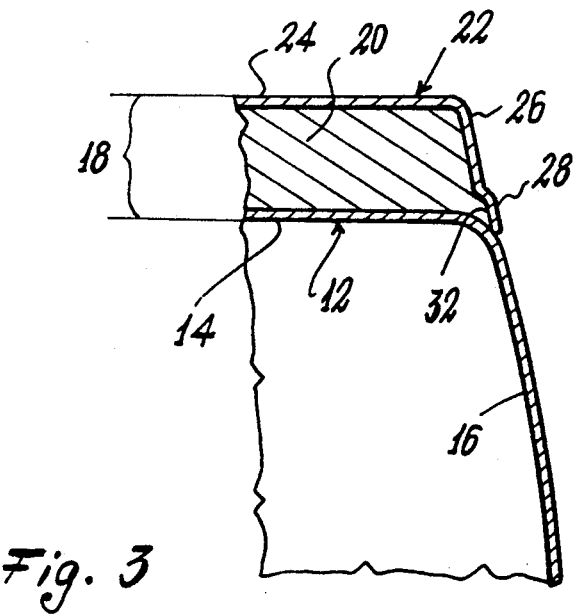
FIG. 3 is a vertical cross-section on the line 3—3 of FIG. 1.

In the specific case shown in FIGS. 1 and 3, the lateral wall 26 of the protection covering 22 is profiled, comprising raised portions consisting substantially of an annular band 28 and teeth 30 which extend upwards from the band 28 until they reach the upper edge of the lateral wall 26 of the protection covering 22. These raised portions are obtained simply by providing corresponding recesses in the die of the mould used in the method of the said patent 1,209,648.

Instead of the illustrated raised portions, depressions or both could be used. Corresponding recesses and/or projections must be provided in the surface of the die of said mould to produce the required shaping in the lateral wall 26 of the protection covering 22.

In the illustrated case, corresponding with the externally visible raised portions 28, 30 there are respective depressions 32, 34 in the inner surface of the lateral wall 26 of the protection covering 22.

Using the aforesaid method for producing the cooking pan, the metal 20 of high thermal conductivity also occupies said depressions 32, 34.

It is also apparent that the shape of the raised portions and/or depressions used for this purpose can be varied at will, compatible with their feasibility and the space available. An interesting consequence is the fact that the shape and arrangement of said raised portions and/or depressions can also confer a certain aesthetic effect on the cooking pan, as can be seen in the specific case of FIG. 1.

A circular cooking pan has been represented in the figures. It is however apparent that the pan can be other than circular, for example oval or rectangular.

I claim:

1. A cooking pan comprising:
    a pan comprising a first lateral wall and a first base wall;
    a solid intermediate layer having a surface in contact with an outer surface of said first base wall, said solid intermediate layer further including outer surfaces not in contact with said first base wall;
    a protective covering comprising a flat second base wall oriented parallel to said first base wall and extending into a substantially annularly shaped second lateral wall;
    said protective covering including an inner surface covering said outer surface of said intermediate layer not in contact with said first base wall,
    said protective covering including projections located in said second lateral wall, and said intermediate layer including a plurality of corresponding recesses structured and arranged to fit in said recesses.

2. A cooking pan as in claim 1, wherein said pan and said protective covering are comprised of a material having low thermal conductivity.

3. A cooking pan as in claim 1, wherein said intermediate layer is comprised of a material having high thermal conductivity.

4. A cooking pan as in claim 1, wherein said first base wall and said first lateral wall are formed together in one piece.

5. A cooking pan as in claim 1, wherein said second base wall and second lateral wall are formed together in one piece.

6. A cooking pan as in claim 1, wherein said recesses located in said intermediate layer and said corresponding projections recesses located in said second lateral wall are structured and arranged to prevent deformations in said protective covering during heating of said cooking pan.

* * * * *